_United States Patent Office_

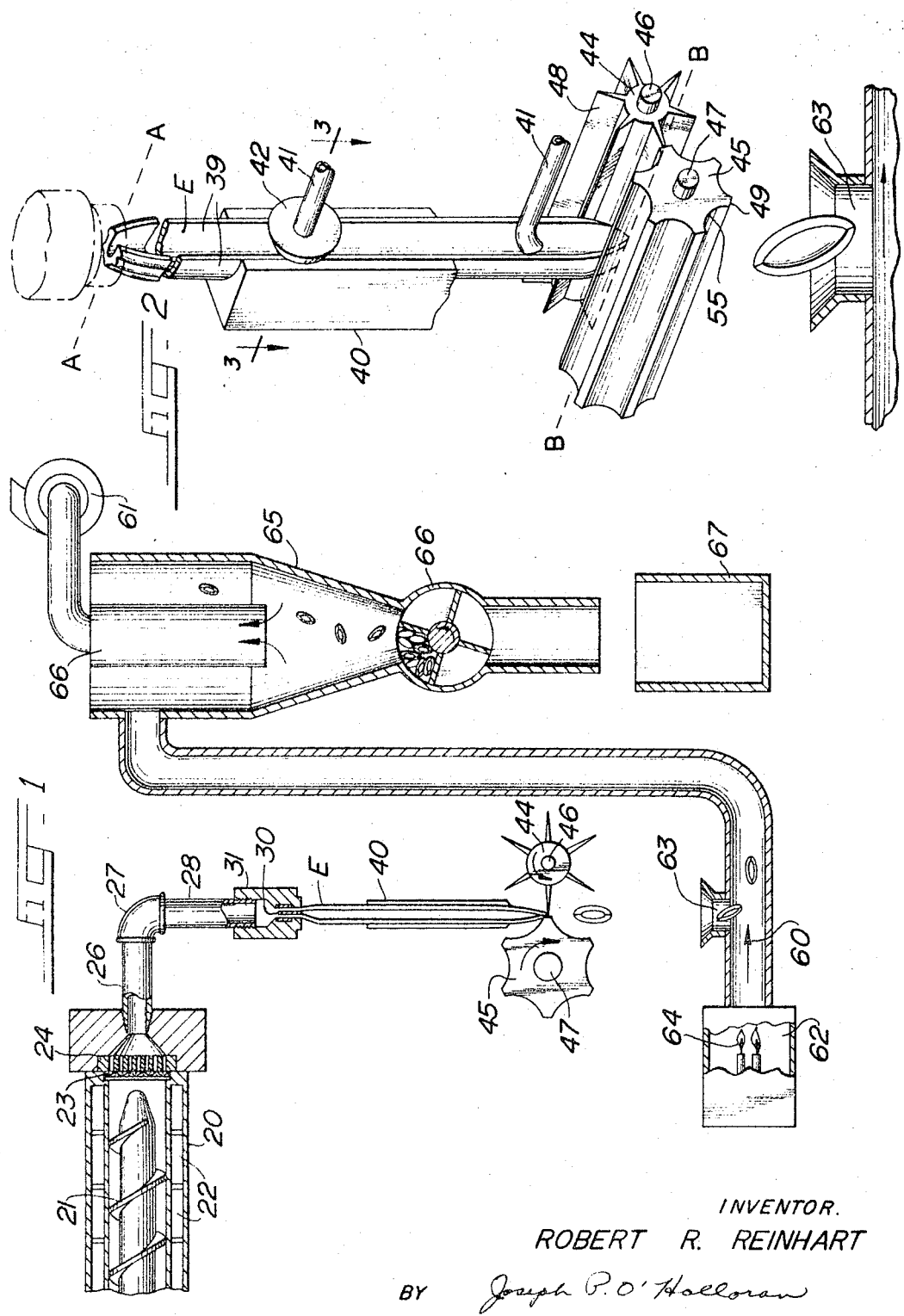

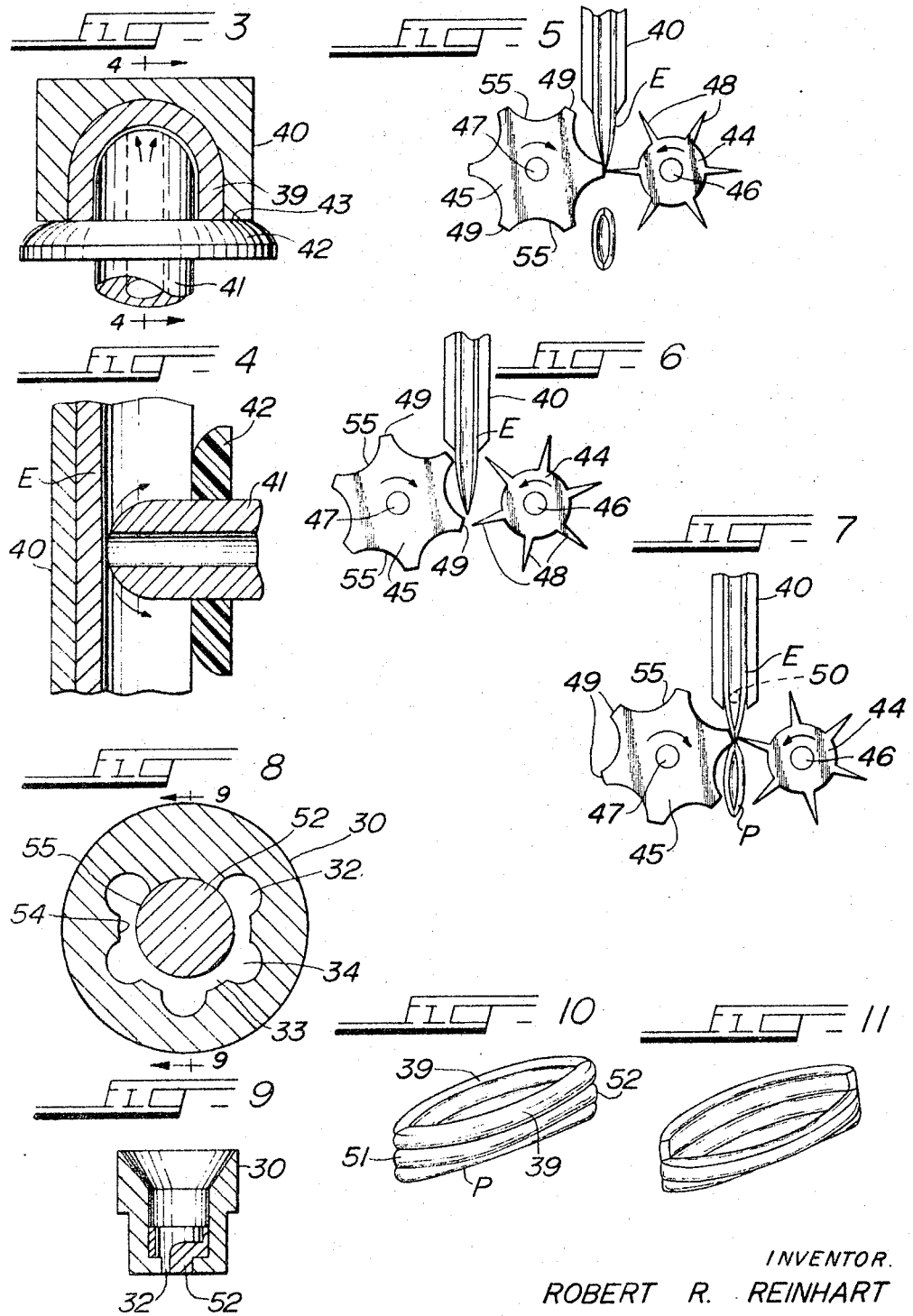

3,462,277
Patented Aug. 19, 1969

3,462,277
METHOD OF SHAPING A CEREAL PRODUCT
Robert R. Reinhart, Des Plaines, Ill., assignor to The Quaker Oats Company, Chicago, Ill., a corporation of New Jersey
Filed Sept. 26, 1966, Ser. No. 582,002
Int. Cl. A23l 1/10
U.S. Cl. 99—81                                    3 Claims This invention relates generally to the production of a ready to eat, dry, cereal food product and more particularly to the production of a canoe-shaped cereal product suitable for use as a snack item or ready to eat cereal product.

A modern ready to eat cereal product should have attractive, palatable appearance and also be of such shape as to stimulate interest in the item. To my knowledge, none of the methods heretofore available provided a canoe-shaped cereal product.

The object of the present invention include the providing of a novel canoe-shaped cereal product having a unique texture and pleasing taste.

Another object is to provide a method of producing a canoe-shaped, dry cereal product.

A still further object is to provide an economical method of producing a canoe-shaped cereal product with a minimal amount of machinery and personnel.

These and other objects are accomplished by the novel and improved method and product of this invention, preferred embodiments of which are illustrated by way of example in the accompanying drawings and described in detail therein.

In accordance with this invention, objects set forth above are accomplished in a method and apparatus in which a continuous extrudate is pinched off into segments by intermittently pinching the continuous extrudate at a pinch-line. The invention includes the steps:

A. Extruding a gelatinized cereal dough under expanding conditions through a substantially U-shaped die, thereby forming a continuous, moving, expanded plastic extrudate having a bi-lateral axis of symmetry, said plastic extrudate exhibiting tackiness for a momentary period of time, B. Orienting said moving extrudate to direct the direction of motion along a line which is substantially perpendicular to said pinch-line, C. Orienting said moving extrudate to cause said bi-lateral axis of symmetry to be substantially parallel to said pinch-line, D. Maintaining the sides of said extrudate in a spaced-apart condition, thereby maintaining a substantially U-shaped cross section, E. Pinching off segments of the extrudate so oriented by intermittently pinching the extrudate at the pinch-line, thereby providing canoe-shaped cereal pieces, said maintaining and said orienting steps and said pinching-off steps taking place in the momentary period of time in which the extrudate is tacky, F. Setting the shape of the resulting segment by immediately drying the segment to a moisture content below about 10%.

Referring to the drawings herein:

FIG. 1 is a schematic view showing apparatus for carrying out the method of this invention.

FIG. 2 is a perspective view showing apparatus for carrying out the invention, including means for orienting the axis of symmetry of the extrudate and means for maintaining the sides of the U-shaped extrudate in a spaced-apart condition.

FIG. 3 is a cross sectional view along the line 3—3 of FIG. 2 showing in greater detail the apparatus for maintaining and orienting the continuous moving plastic extrudate.

FIG. 4 is a cross sectional view along the line 4—4 of FIG. 3 showing a preferred form of an orienting means.

FIGURES 5, 6 and 7 show the feeding of the oriented U-shaped extrudate through the cutting or pinching rolls.

FIG. 8 is a cross sectional view of a preferred die.

FIG. 9 is a cross sectional view along the line 9—9 of FIG. 8.

FIG. 10 is a perspective view of a preferred form of the final product.

FIG. 11 is a perspective view of an improperly formed item not in accordance with this invention.

In carrying out the process to produce a canoe-shaped cereal product, a base mix is prepared, composed of cereal flour, grits, or the like, with small additions of sweetening, seasoning, stabilizers, enriching and coloring ingredients. Flour, grits, or the like, from rice, corn, wheat, rye, oats and combinations of these are particularly useful. Other comminuted edible material such as soy flour may be used in conjunction with these cereals. The mix may be blended dry and then have water added, or water may be added simultaneously with the mixing. In either event, sufficient water is added to adjust the moisture content of the mixture to 13 to 35%, more preferably 18 to 21%. The method of mixing and adjusting of moisture content per se forms no part of the present invention.

The resulting mixture is then introduced into a continuous heat exchanger, preferably in the form of a screw extruder of conventional construction. During the passage of the mixture through the extruder, the mixture is heated to extrusion temperatures and the starch in the mixture is gelatinized while the dough is cooked and transformed into a rubber-like mass. Generally speaking, extrusion temperatures in the range 212° to 375° F. are particularly useful, temperatures in the range 250° F. to 350° F. being preferred.

In FIG. 1 the discharge end portion of the extruder is shown at 20. The rotating screw conveyor is enclosed within a jacket 22, through which a heating medium such as steam is circulated. The screw 21 preferably has a compression ratio of about 3 or 4 to 1 and the compression of the moist cereal mixture increases the heat transferred to the mixture, and subjects the dough being formed to vigorous working and high rates of sheer. At the end of the extruder the screen pack 23 of one or more 40-mesh screens may be provided for preventing foreign matter or non-plasticized material from passing to the extruder die and for increasing that pressure in the extruder. Also, a breaker plate 24 having a plurality of holes about 1/8" in diameter may be mounted behind the screen pack 23 to increase the sheering action and further increase the back pressure. The use of the screen pack and breaker plate at the exit end of an extruder for plastic material is well known. The dough is forced by the screw through the screen pack and breaker plate into the horizontal pipe 26 and thence through an elbow 27, and a vertical pipe 28 at the bottom of which is mounted an extruding die 30 through which the dough is extruded in a vertically downward direction. Heat may be applied to the pipes 26 and 28 by any suitable means to maintain the dough therein at a desired temperature.

As shown schematically in FIG. 1, the extruding die 30 may be mounted at the lower end of a cylindrical sleeve or housing 31, the upper end of which is screwed in on the bottom end of the pipe 28.

FIGURES 8 and 9 shows details of a preferred die which can be removably mounted at the lower end of a cylindrical housing 31. As shown in FIG. 8, the die orifice 32 is arranged in a substantially U-shaped configuration having an axis of symmetry e.g. along the line 9—9. The line 9—9 of FIG. 8 corresponds to the line AA of FIG. 2. In a preferred die such as that illustrated in FIG. 8, the die orifice has intermittent narrow portions 33 and enlarged portions 34. The narrow portions may be of the order of .025″. The enlarged portions may be formed by circular cuts having a diameter in the order of .090″. While it is essential that the orifice of the die have a generally U-shaped configuration, it is not essential that the orifice be of the specific shape depicted in FIG. 8. This will be discussed further hereinafter.

The flow of the dough around the insert 52 creates the open interior of the U-shaped cross section of the extrudate. The die orifice 32 may consist of alternating enlarged portions 34 and narrow portions 33 as shown in FIG. 8 or may consist of an orifice having uniform spacing between the opposite sides, e.g. between a point on the surface 54 and a point on the surface 55. It is preferred that the insert 52 be easily separated from the rest of the die 30 to facilitate cleaning. Alternatively, the U-shaped extrudate may be formed by extruding the expanding dough through a die in which the orifices are a series of closely-spaced independent apertures arranged in a substantially U-shaped configuration. Such a die can be constructed as shown in FIG. 8 except that the enlarged portions 34 of FIG. 8 are independent and are not connected by the narrow portions 33 as shown in FIG. 8. Further examples of this kind of die orifice configuration are to be found in U.S. Patent 3,054,677 to W. R. Graham et al. However, for use in accordance with this invention the independent closely-spaced openings must provide a U-shaped or semi-circular pattern. Expansion of the dough results in contacting of the individual strands and coalescing of the individual strands to provide a U-shaped extrudate.

Many variables, such as the cross sectional areas afforded by the die aperture, the axial length of the orifice (land length), the dough temperature, pressure and moisture content, the particular cereal making of the dough mixture, etc. are known to affect the degree of expansion upon extrusion. The role of these variables on degree of expansion on extrusion is known in the art. It is preferred that the extradate be expanded to such a degree that the final product exhibits a uniformly porous cross sectional structure with delicate blister on the surface of the product.

The dough is extruded from the die 30 in the form of a U-shaped extrudate E, flowing continuously downward The extrudate initially has an axis of symmetry along the line AA of FIG. 2 (see also the line 9—9 of FIG. 8). The rapidly moving extrudate would ordinarily not flow in a straight line but would move about in a very erratic manner, due to the forces exerted at the orifice of the die when the extrudate expands upon being released into the atmosphere. Furthermore, the extrudate at this point, i.e. at this instant in time, is found to be a highly plastic, tacky material. Under ordinary conditions, the U-shaped cross section would immediately be lost. Very often the sides of the U-shaped extrudate come together and coalesce.

In accordance with this invention, however, the direction of motion of the continuous extrudate is oriented along a line which is substantially vertical to the pinch line, i.e. the line illustrated by BB of FIG. 2. This orientation step may be accomplished by causing the moving extrudate to move through an orienting means such as the block 40 which provides a U-shaped groove through which the extrudate may move (see FIG. 3). The block 40 may be made of Teflon, for example. The lower portion of the block 40 shown in FIG. 2 is shown cut away for the purpose of clarifying the view of the extrudate as it enters the nip.

The fingers 41 shown in FIGURES 2, 3 and 4 extend in between the side walls 39 of the moving U-shaped extrudate and these fingers thus serve two purposes. First of all, the fingers 41 maintain the side walls 39 of the extrudate in a spaced-apart condition and secondly, they keep the extrudate moving in the U-shaped groove of the guide block 40. Thus, causing the U-shaped extrudate to pass between the fingers, so positioned, and the guide block assures vertical alignment of the extrudate with the pinch line BB, and moreover maintains the side walls of the U-shaped extrudate in a spaced-apart relationship. The rounded collar 42 shown maintains the moving extrudate in an orientation such that the axis of symmetry of the extrudate cross section is perpendicular to the surface of the collar 43 which is in contact with the U-shaped extrudate. Thus by alignment of the surface of the collar 43 to be perpendicular across the pinch line BB the orientation of the moving U-shaped extrudate is such that the axis of symmetry is parallel to the pinch line BB. While the finger 41 is shown as a hollow tube, it is not essential that such a tube be used. A Teflon rod of suitable dimensions or other similar construction may be employed. In the preferred embodiment, however, compressed air is blown through the tube 41 thus minimizing friction between the U-shaped extrudate and the finger 41. Also the collar 42 may be replaced by bars, not shown, preferably having a cross section similar to the cross section of the collar 42 shown in FIG. 4 or by attachments to the block 40 which keep the side walls of the U-shaped extrudate oriented so that the axis of symmetry of the extrudate is parallel to the pinch line BB when the extrudate is pinched into canoe-shaped segments. It is preferred that the block 40 extend as close as practical to the cutting rolls 44 and 45 as shown in FIGURES 5, 6 and 7.

The cutting rolls employed in accordance with this invention are well known in the art. They consist of a knife roll 44 and a back-up roll 45 rotatably mounted on axles 46 and 47, respectively. The rotation of the two rolls is co-ordinated by conventional means not shown so that the rotational velocity of each roll is identical and so that the knife-blades 48 meet with corresponding back-up surfaces 49 of the back-up roll 45 as shown in FIG. 5. Hence it is seen that at this point the line formed by the edge of the knife-blade contacting its opposing back-up surface on the back-up roll constitutes the pinch line BB. It is at this point that a segment of the U-shaped extrudate is severed from the moving continuous extrudate. As the rolls continue to rotate, the moving U-shaped extrudate proceeds downwardly into the area between the rolls 44 and 45 as shown in FIG. 6 and again the extrudate is pinched by the succeeding knife-blade and the back-up surface as they move into contact with each other as shown in FIG. 7, so that the portion of the extrudate which is ahead of the line thus pinched becomes separated from the continuous extrudate as illustrated in FIG. 5. While no fingers 41 are shown in FIGURES 5, 6 and 7, for the purpose of simplifying these views it is preferred that a finger 41 be inserted in the U-shaped extrudate as shown in FIG. 2 as close as practical to the point in which the U-shaped extrudate is pinched, e.g. at the location 50 indicated in FIG. 7. It is also preferred that a collar 42 or its equivalent as described above, be employed close to the cutting rolls, e.g. at the cut-away portion of the block 40 on FIG. 2 to further assure proper orientation of the line of symmetry of the extrudate with the pinch line BB. It is clear then that a plurality or a multiplicity of fingers 41 and collars 42 may be used as orientation means.

The action of the cutting knife and of the back-up roll, described above, not only brings a small portion of the sides of the U-shaped extrudate together and severs a segment of the extrudate, but in addition, because of the momentary tacky quality exhibited by the moving extrudate, causes the contacting sides to adhere to one another where pinched to form the bow 51 and stern 52 as shown in FIG. 10. The unpinched portions of the sides 39 curve smoothly outward, retaining a U-shaped cross section.

However, if the axis of symmetry of the U-shaped extrudate is not parallel to the pinch line BB as is required by this invention, but to the contrary forms a substantial angle with the pinch line BB, a structure similar to that in FIG. 11 results from the pinching off step. If the axis of symmetry is at substantially right angles to the pinch line BB when the segment is cut off a structure resembling a sheet is formed. Hence it is clear that in accordance with this invention it is essential that the axis of symmetry of the extrudate be substantially parallel to the pinch line BB when the segment is pinched off.

In the practice of this invention the speed of rotation of the cutting rolls 44 and 45 must be co-ordinated with the speed of movement of the extrudate E. Hence the linear velocity of a point on the tip of the knife-blades 48 must be equal to, or exceed, the linear velocity of the moving extrudate E. The operator can readily determine an optimum speed of rotation of the cutting rolls by varying the roll speed and setting the rate at that speed which is just fast enough to take the product away evenly. It is preferred that the knife-blades 48 be mounted in the cutting roll 44 so they back against springs (not shown) to provide the conventional "spring-loaded" cutting rolls well known in the art. It is, furthermore, highly desirable that the back-up roll 45 contain grooves 55 between the back-up surfaces 49 to facilitate unobstructed flow of the extrudate E between the cutting rolls 44 and 45 as shown in FIG. 6 and to minimize contact between the extrudate and the back-up roll during the pinching off operation as shown in FIG. 7.

The separated canoe-shaped pieces are then dried to below 15% moisture. For example, the separated canoe-shaped segments are permitted to fall into a high velocity, high temperature conveying air stream 60. The temperatures of this air stream in the range 500 to 1000° F. are useful, with temperatures in the range 550 to 700° F. being preferred. The product in the air stream is thus immediately dried to a moisture level below about 15% to set the shape of the product. In preferred embodiments, e.g. those in which the mixture in the extruder contained between 13 and 23% moisture, it is preferred that the canoe-shaped segments be dried immediately to below 10% moisture. While it is essential that the product be dried sufficiently to set the shape, i.e. below about 15% water, preferably below 10% water, the extent of the drying accomplished in the high temperature conveying air stream will be dictated by subsequent processing requirements. If, for example, the canoe-shaped product is to be enrobed by spraying with a suitable enrobing solution or emulsion, this drying step may be carried out to provide a moisture level of about 7%. If no further processing is required, however, the hot conveying air stream may be used to provide final product moisture level, e.g. less than 5%. It is noted that relatively high moisture levels, e.g. 6 to 10% are desirable if the product is to be enrobed since the handling of such product results in less breakage than in the handling of the very dry product, e.g. product having moisture levels, e.g. less than 5%. The amount of time in which the product resides in the conveying hot air system commonly referred to as a Flash System is very short, e.g. less than 30 seconds, usually in the order of 10 seconds.

The apparatus of a suitable flash system is illustrated schematically in FIG. 1. The high velocity of the conveying air stream results from the action of the exhaust fan 61, which draws air through the furnace 62 primarily, and also through the product entry port 63. The high temperature of the conveying gas, which is mostly air, is developed by heat from gas jets 64 in the furnace. The product is separated from the conveying gas in a cone-shaped separator 65 from which the gas is conducted through a plenum 66 to the exhaust fan 61. The product collects at the bottom of the separator in a revolving valve 66 which permits removal of the product while sealing the separator. Upon rotation of the valve lock 66 the collected product is discharged into a suitable receiver 67.

The novel product of this invention has a unique, blistered, interesting appearance, and is especially crisp.

The speed at which the shaped canoes can be made in accordance with this invention is very high. For example, canoes have been produced at the rate of about 2500 canoes per minute. The only upper limitation on production rate in the process of this invention, given infinitely-variable speed cutting rolls, appears to be the capacity of the extruder, and the drier.

I claim:
1. In a process in which a cooked cereal dough is extruded to form a continuous extrudate and the extrudate is divided into segments by pinching of the extrudate on a pinch line, the method for forming a canoe-shaped cereal product comprising the steps:
   (A) extruding a gelatinized cereal dough containing 13 to 35% moisture under expanding conditions through a substantially U-shaped orifice, thereby forming a continuous, moving, expanded plastic extrudate having a bi-lateral axis of symmetry, said plastic extrudate exhibiting tackiness for a momentary period of time,
   (B) orienting said moving extrudate to direct the direction of motion along a line which is substantially perpendicular to said pinch-line,
   (C) orienting said moving extrudate to cause said bi-lateral axis of symmetry to be substantially parallel to said pinch-line,
   (D) maintaining the sides of said extrudate in a spaced-apart condition, thereby maintaining a substantially U-shaped cross section,
   (E) pinching off segments of the extrudate so oriented by intermittently pinching the extrudate at the pinch-line, thereby providing canoe-shaped cereal pieces, said maintaining and said orienting steps and said pinching-off steps taking place in the momentary period of time in which the extrudate is tacky,
   (F) setting the shape of the resulting canoe-shaped cereal pieces by immediately drying the segment to a moisture content below about 15%.

2. A method as in claim 1 in which the cooked cereal dough contains 13 to 23% moisture, and the dough is extruded at a temperature in the range 250° F. to 350° F.

3. A method as in claim 1 in which the canoe-shaped cereal pieces are dried to a moisture content below 10% by conveying said pieces in a high velocity gas stream having a temperature in the range 550° F. to 700° F. for a period of time less than 30 seconds.

References Cited

UNITED STATES PATENTS 2,338,588  1/1944  Kishlar et al. _____ 107—2 XR
3,054,677  9/1962  Graham et al. _____ 107—2 XR RAYMOND N. JONES, Primary Examiner JAMES R. HOFFMAN, Assistant Examiner U.S. Cl. X.R.

99—237; 107—2